(12) United States Patent
Heurlin et al.

(10) Patent No.: US 9,481,336 B2
(45) Date of Patent: Nov. 1, 2016

(54) VEHICLE STEERING ARRANGEMENT AND A VEHICLE COMPRISING SUCH A STEERING ARRANGEMENT

(71) Applicant: VOLVO CAR CORPORATION, Gothenburg (SE)

(72) Inventors: Fredrik Heurlin, Torslanda (SE); Harald Hasselblad, Gothenburg (SE)

(73) Assignee: VOLVO CAR CORPORATION (SE)

(*) Notice: Subject to any disclaimer, the term of this patent is extended or adjusted under 35 U.S.C. 154(b) by 0 days.

(21) Appl. No.: 14/488,370

(22) Filed: Sep. 17, 2014

(65) Prior Publication Data
US 2015/0096824 A1    Apr. 9, 2015

(30) Foreign Application Priority Data
Oct. 3, 2013 (EP) .................................. 13187199

(51) Int. Cl.
B62D 1/16 (2006.01)
B62D 6/00 (2006.01)
B60R 21/203 (2006.01)
B62D 1/19 (2006.01)
B62D 5/04 (2006.01)
B60R 21/00 (2006.01)

(52) U.S. Cl.
CPC .............. B60R 21/203 (2013.01); B62D 1/16 (2013.01); B62D 1/192 (2013.01); B62D 1/197 (2013.01); B62D 5/04 (2013.01); B62D 6/00 (2013.01); B60R 2021/0006 (2013.01)

(58) Field of Classification Search
CPC .......... B62D 1/192; B62D 1/19; B62D 1/18; B62D 1/16; B62D 1/20; B62D 5/04; B62D 5/003; B62D 5/0481; B62D 5/001; B62D 5/0463; B62D 5/00; B62D 6/00; Y10T 403/11

USPC .............. 180/271, 274, 444, 78; 74/492; 280/777, 750; 701/41
See application file for complete search history.

(56) References Cited

U.S. PATENT DOCUMENTS 3,911,759 A * 10/1975 Tanaka .................. B62D 1/195
188/376
7,931,296 B2    4/2011 Choi
(Continued)

FOREIGN PATENT DOCUMENTS

DE    102007028770 A1    12/2008
DE    102009046375 A1    5/2011
(Continued)

OTHER PUBLICATIONS

Extended European Search Report Dated Mar. 24, 2014, Application No. 13187199.8-1755, Applicant Volvo Car Corporation, 8 Pages.

*Primary Examiner* — Keith Frisby
(74) *Attorney, Agent, or Firm* — Brooks Kushman P.C.

(57) ABSTRACT

The disclosure relates to a vehicle steering arrangement comprising a steering wheel and a torque transmitting steering column arrangement arranged to connect the steering wheel with front wheels of a vehicle. The steering arrangement comprises at least a first steering column part connected to the steering wheel and a second steering column part connected to the front wheels. The first and second steering column parts are connected to each other by a decoupling device adapted to decouple the first and second steering column parts from each other when an accident is detected so that the second steering column part can rotate in relation to the first column part. The disclosure also relates to a vehicle comprising such a steering arrangement.

16 Claims, 2 Drawing Sheets

(56) References Cited

U.S. PATENT DOCUMENTS

| | | |
|---|---|---|
| 8,281,684 B2 | 10/2012 | Frasch et al. |
| 2012/0330509 A1 | 12/2012 | Kornhaas et al. |
| 2013/0038044 A1 | 2/2013 | Nagasawa et al. |
| 2014/0209403 A1* | 7/2014 | Ogi .................. B62D 1/16 180/280 |

FOREIGN PATENT DOCUMENTS

| | | |
|---|---|---|
| DE | 102011120778 A1 | 6/2013 |
| GB | 2028740 A | 3/1980 |
| JP | 02267072 A | 10/1990 |
| JP | 2005112130 A | 4/2005 |
| WO | 2008140633 A1 | 11/2008 |

* cited by examiner

VEHICLE STEERING ARRANGEMENT AND A VEHICLE COMPRISING SUCH A STEERING ARRANGEMENT

CROSS-REFERENCE TO RELATED APPLICATIONS

This application claims foreign priority benefits under 35 U.S.C. §119(a)-(d) to European patent application number EP 13187199.8, filed Oct. 3, 2013, which is incorporated by reference in its entirety.

TECHNICAL FIELD

The present disclosure relates generally to a steering arrangement comprising a rotation countermeasure system and a vehicle comprising such a steering arrangement.

BACKGROUND

Some vehicle crash situations may cause a force acting locally on one of the front wheels in a direction essentially perpendicular to the wheel. This force may cause a turning of the wheels. Since the wheels are connected to the steering wheel this may in turn result in a sudden steering wheel rotation. A sudden and unexpected rotation of the steering wheel may cause injury to the driver of the vehicle, for example in the hands and arms. Further, if a passive safety device, such as an airbag system, is mounted in the steering wheel, this rotation may result in a non-optimal engagement between occupant and airbag.

In current airbag systems the airbag protecting the driver is usually mounted in the central hub of the steering wheel and rotates with the steering wheel. An airbag cushion can be both symmetrical and asymmetrical in shape and is optimized to protect the driver. If the airbag rotates with the steering wheel during a crash, the symmetrical or asymmetrical airbag shape may instead introduce unintended forces on the drivers head/neck, this may lead to that the driver is unintentionally injured by the airbag or that he/she is guided in a direction offset from the airbag.

The above mentioned problems with the unintentional steering wheel rotation and airbag position are for example concerned in patent applications U.S. Pat. No. 7,931,296B2 and WO2008140633A1.

In U.S. Pat. No. 7,931,296B2 a steering arrangement includes a steering column and a steering wheel gear arranged offset from each other so that the torque from the steering wheel is transmitted to the steering column. An airbag module received in a steering wheel hub of the steering wheel is independently mounted such that it is not rotated together with the steering wheel by using the offset torque transmission structure interconnecting the steering wheel and steering column. Such configuration allows deployment of a cushion independent of shape with less risk of introducing unintended forces on head/neck.

In WO2008140633A1 it is disclosed a steering wheel assembly having a steering wheel armature, a hub portion and spokes. The hub portion is fixable to a conventional steering column shaft. The steering wheel assembly has a first drum supported on the steering column shaft, to freely rotate about only the axis of the steering column shaft. A second drum is freely rotatable with respect to the first drum about a second axis. The second axis is parallel to and spaced apart from or incident to the steering column shaft. Stationary support means are provided for supporting the second drum on the first drum. The support means provides a stationary support member, onto which an airbag module can be mounted, thus allowing the airbag module to remain stationary with respect to the vehicle during rotation of the steering wheel.

The above solutions require a reconstruction of the entire steering wheel and/or steering wheel column. A reconstructed steering wheel column may be difficult to insert in the tightly designed space in the vehicle and may require further redesign of the vehicle and vehicle parts. Further, a construction using a plurality of shafts or gears to keep the airbag module in a stationary position is cumbersome and complicated. Thus, it would be advantageous to provide a steering wheel assembly with a rotation countermeasure function requiring as little redesign of the steering column as possible.

SUMMARY

An object of the present disclosure is to provide a steering arrangement comprising a rotation countermeasure system which engages or otherwise functions during an accident to prevent unintentional rotation of the steering wheel. Another aspect of the disclosure is to provide a vehicle comprising such a steering arrangement.

Thus, the disclosure relates to a steering arrangement comprising a steering wheel and a torque transmitting steering column arrangement arranged to connect the steering wheel with the front wheels of a vehicle. The disclosure is in one embodiment characterized in that it comprises at least a first steering column part connected to the steering wheel and a second steering column part connected to the front wheels. Said first and second steering column parts are connected to each other by a decoupling device adapted to decouple said first and second steering column parts from each other when an accident is detected so that said second steering column part is possible to rotate in relation to said first steering column part.

When the second column part connected to the front wheels is able to rotate in relation to the first column part connected to the steering wheel, the large forces originating from an accident and acting in a direction essentially perpendicular to the front wheels does not create a rotation of the steering wheel. Thus, the risk of hand injuries of the driver is reduced. Further, it is possible to use both symmetrical and asymmetrical airbag cushions which provide a better protection for the driver.

In one embodiment, the decoupling device is adapted to be activated to decouple the first and second steering column parts when an activation signal indicating a crash situation from a sensor detecting an accident is emitted and/or when forces originating from a crash situation act on at least one of the front wheels in a direction essentially perpendicular to the at least one wheel.

When using a signal from a crash sensor to activate the decoupling device, an active separation of the first and second steering column parts is created at the time of the crash. If instead the forces acting on at least one of the wheels is used to activate the decoupling device, the torque twisting the steering column, created from the unwanted, force induced turning of the front wheels, create a passive separation of the first and second steering column parts. Thus, the torque itself twists off the steering column arrangement at the location of the decoupling device.

In one embodiment, the decoupling device is at least one designed material weakening point in the steering column arrangement arranged to separate the steering column into the at least first and second steering column parts.

Using a material weakening point as the decoupling device is a simple yet effective way to create an indication of fracture in the steering column arrangement.

In one embodiment, the weakening point has a material weakening with lower torsion strength than the rest of the steering column arrangement.

The material weakening may for example be a cut out in the steering column, a different material with a lower torsion strength than the rest of the steering column arrangement, an area having a smaller diameter or material thickness than the rest of the steering column arrangement or any other material weakening.

In another embodiment, the decoupling device is a rotational coupling allowing a rotational movement between the first and second steering column parts.

In one embodiment, the rotational coupling comprises a locking device arranged to lock the first and the second steering column parts together creating the torque transmitting steering column arrangement.

The locking device may comprise a mechanical, frictional, hydraulic, magnetic, electrical or any other type of lock.

When using a rotational coupling with a locking device as the decoupling device, the decoupling process can be very thoroughly controlled. When the activation signal is emitted from the crash sensor the locking device can within milliseconds release the second steering column part from the first steering column part.

In one embodiment, a force creating device is arranged to activate the decoupling device and to decouple the first and second steering column parts.

The force creating device may for example be a mechanical or pyrotechnical device connected to the decoupling device. The force creating device creates a force or a shock wave having the strength to disengage the locking device of the rotational coupling or to create a crack in the weakening point which in turn leads to a separation of the first and second steering column parts.

In one embodiment, said arrangement comprises a sensor detecting an accident which is adapted to transmit an activation signal for decoupling of the first and second steering column parts.

This sensor may be the regular crash sensor of the vehicle or may be a separate sensor specially adapted for steering arrangement purposes.

In another embodiment, the steering wheel comprises an airbag module with a symmetrical or asymmetrical air bag cushion arranged in the steering wheel hub.

The air bag cushion is connected to a crash sensor and adapted to be inflated when a crash is detected. A symmetrical air bag cushion used in this non rotating system has the advantage of a less risk of introducing unintended forces on head/neck, since it is stationary during the crash. The asymmetrical air bag cushion may be designed to give a better support to a driver during an accident. This asymmetrical air bag cushion provides a better protection of the driver and may be a structure where the inflated cushion is optimized to avoid contact with the chest of a driver or to reduce pressing contact to minimize force and reduce injury to the chest of a driver. It may be arranged in the steering wheel hub so that is has an extension direction essentially in line with a steering wheel axis defining a 0 degree turn of the front wheels, i.e., in a direction essentially parallel to the x-z plane of the vehicle in the ENU-coordinate system.

In another embodiment, the arrangement comprises a steering wheel lock arranged to prevent the steering wheel from rotating.

The steering wheel lock allows the steering wheel, with possible airbag module, to remain stationary with respect to the vehicle during rotation of the front wheels.

In one embodiment, the steering wheel lock is arranged to lock the steering wheel in a position essentially parallel to a steering wheel axis defining a 0 degree turn of the front wheels.

The stationary locked position is preferably arranged so that the steering wheel is in its original zero-position, i.e., where during normal driving the wheels would be directed parallel with the x-coordinate of the vehicle in the ENU-system. The steering wheel is locked in this position at approximately the same time as the decoupling device is activated and the first and second steering column parts are separated from each other. When locking the steering wheel in this position the asymmetrical air bag cushion gives an optimized protection of the driver.

In another embodiment, the arrangement comprises an electrical steering system which is adapted to automatically rotate the steering wheel.

When using electrical steering it is possible to automatically rotate the steering wheel, when it is detached or decoupled from the steering column, until the steering wheel is oriented in its original zero-position or in other positions defined by different steering wheel angles. The shape of air bag cushion may be optimized when being inline with these different steering wheel angles.

Another aspect of the disclosure relates to a vehicle comprising a first and a second front wheel and a steering wheel assembly according to the above described.

In one embodiment the vehicle comprises an electrical steering system which is adapted to automatically rotate the steering wheel to assist the driver.

The electrical steering system used to automatically rotate the steering wheel may be a vehicle integrated system already in use to assist the driver with certain maneuvers such as lane keeping and parking. The electrical steering system may also be used to automatically rotate the steering wheel into a specific position, when an accident is detected and the steering wheel is detached from the steering column.

BRIEF DESCRIPTION OF THE DRAWINGS

Example embodiments according to the disclosure will now be described with reference to the accompanying drawings.

DETAILED DESCRIPTION

In the following, a detailed description of different embodiments of the disclosure is provided with reference to the accompanying drawings. However, it is to be understood that the disclosed embodiments are merely exemplary and that various and alternative forms may be employed. Furthermore, the figures are not necessarily to scale. Some features may be exaggerated or minimized to show details of particular components. Therefore, specific structural and functional details disclosed herein are not to be interpreted as limiting, but merely as a representative basis for teaching one skilled in the art. In addition, all examples herein should be seen as part of the general description and are therefore possible to combine in any way in general terms. Again, individual features of the various embodiments and methods may be combined or exchanged unless such combination or exchange is clearly contradictory to the overall function of the steering arrangement.

Briefly described, the disclosure relates to a steering arrangement comprising a rotation countermeasure system put in action when a crash situation is detected and a vehicle comprising such a steering arrangement. The rotation countermeasure system comprises a decoupling device which engages during an accident to prevent unintentional rotation of the steering wheel.

Figure 1:
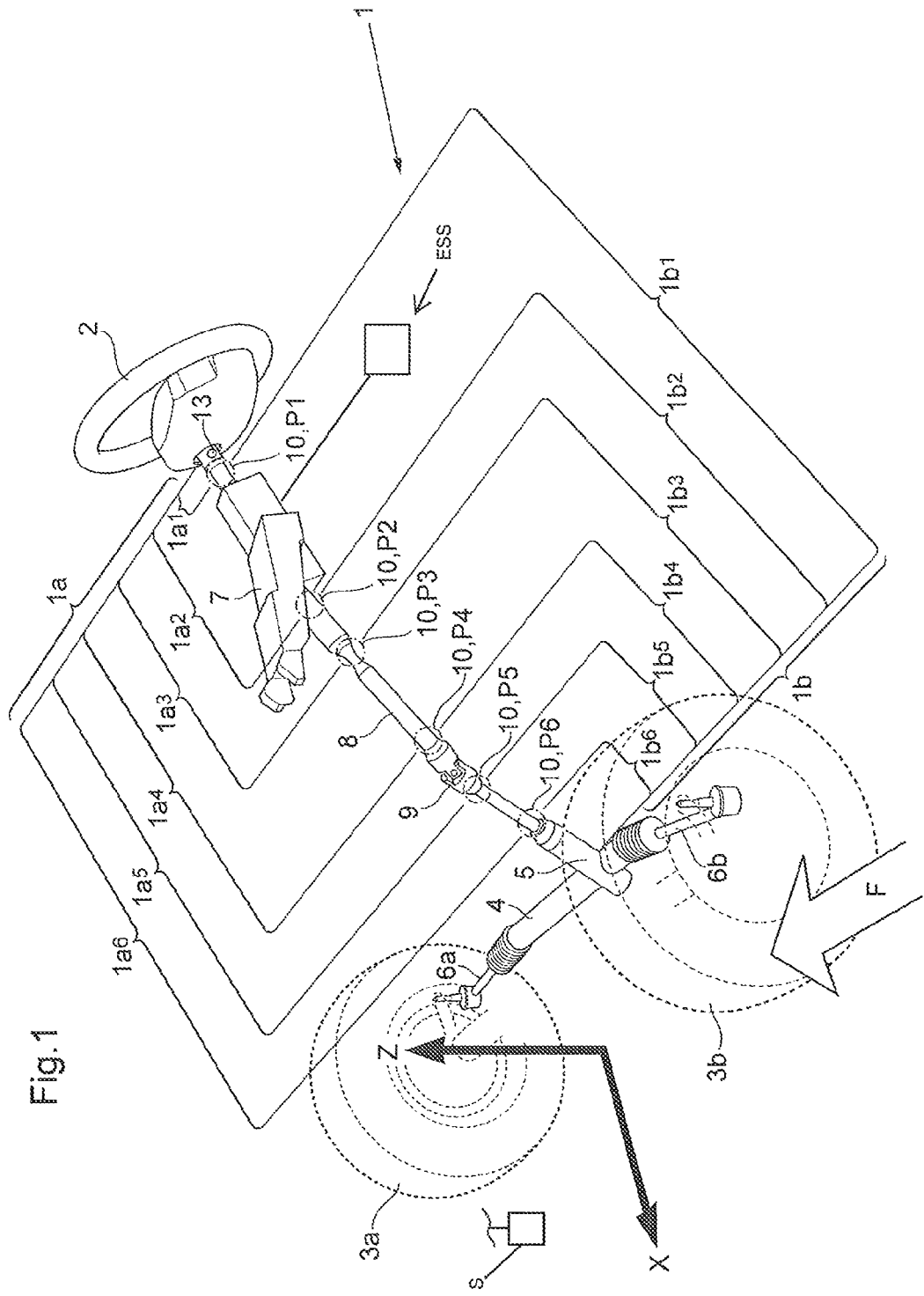
FIG. 1 discloses the steering arrangement with different possible decoupling points.

In FIG. 1 the steering arrangement SA is shown as a part of a vehicle. The steering arrangement comprises a steering column arrangement 1 and a steering wheel 2 which are connected to a first and a second front wheel 3a, 3b of a vehicle. The steering wheel 2 is attached to a first steering column part 1a; 1a1, 1a2, 1a3, 1a4, 1a5, 1a6 at an upper end of the steering column 1. A second steering column part 1b; 1b1, 1b2, 1b3, 1b4, 1b5, 1b6 is connected to the vehicle front wheels 3 at a lower end of the steering column 1. The steering column 1 may further comprise a pinion 5, which meshes with a rack bar 4 for moving tie rods 6a, 6b steering the vehicle wheels 3a, 3b. The term steering column 1 shall be interpreted as including all separate parts between the steering wheel 2 and the rack bar 4, for example the steering column assembly 7, intermediate shaft 8, universal joint 9 and other possible, not named parts. Torque is transmitted from the steering wheel 2 to the vehicle wheels 3a, 3b via the steering column 1, rack bar 4 and tie rods 6a, 6b and vice versa when a wheel is under the influence of an external force F acting on the peripheral parts of the wheel in a direction essentially perpendicular to the front wheels. This force F occur during some specific accident situations and causes the inverted torque twisting the steering column arrangement, which in prior art may result in an unwanted turning of the steering wheel. The force F originating from a crash situation is much higher, preferably about 70%-100% higher, than the forces acting on the wheel under normal driving conditions.

The vehicle may also be equipped with an electric steering system ESS (shown schematically in FIG. 1) using an electric motor to assist the driver of the vehicle to steer the front wheels 3a, 3b by rotation of the steering wheel 2. The electric steering system preferably comprises different types of sensors and a control unit. The control unit sends a signal to automatically rotate the steering wheel when the sensors detect a certain situation. Sensors may for example detect the vehicle speed and position on the road and the electrical steering system together with other vehicle integrated system are used to keep the vehicle in a specific lane. The system may also be used to help the driver when parking the vehicle.

Somewhere between the first and second steering column parts 1a1, 1a2, 1a3, 1a4, 1a5, 1a6; 1b1, 1b2, 1b3, 1b4, 1b5, 1b6 is at least one decoupling device 10 arranged. In FIG. 1, several possible locations P1, P2, P3, P4, P5 and P6 of the decoupling device 10 are shown. However, it is of course also possible to place the at least one decoupling device at any location between the steering wheel 2 and the rack bar 4. Which parts included in the first and second steering column part respectively 1a1, 1a2, 1a3, 1a4, 1a5, 1a6; 1b1, 1b2, 1b3, 1b4, 1b5, 1b6 depend on where the decoupling device 10 is arranged and may vary between different embodiments of the steering arrangement, as is disclosed in the figure.

The decoupling device 10 is adapted to decouple said first and second steering column parts 1a, 1b from each other so that said second steering column part 1b is possible to rotate in relation to said first column part 1a. The decoupling device 10 is activated when an accident is detected or occurs. The activation may be triggered actively by an activation signal originating from a sensor S (shown schematically in FIG. 1) detecting an accident with certain critical loads and/or passively by the torque twisting the steering column 1 arrangement when a force F acting on and essentially perpendicular to the front wheels 3a, 3b is present. The activation signal may for example originate from a crash sensor integrated in the original vehicle crash detecting system or from a separate sensor connected to or integrated with the steering arrangement SA.

Figure 2:
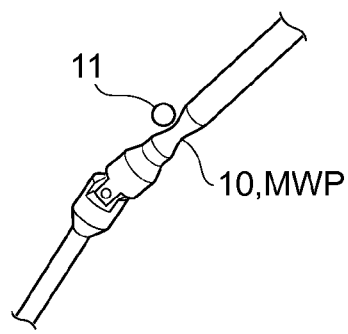
FIG. 2 discloses a first embodiment of a decoupling device.

In FIG. 2, the decoupling device 10 is at least one designed material weakening point MWP. The weakening point MWP is in this embodiment arranged near the universal joint 9, however this location is optional. The weakening point may be designed to be a material weakening with a lower torsion strength than the rest of the steering column arrangement. The torsion strength of the weakening point may be in the interval of 70-95% of the rest of the steering column arrangement. For example, said material weakening may be a cut out in the steering column, a different material with a lower torsion strength than the rest of the steering column arrangement or an area having a smaller diameter or material thickness than the rest of the steering column arrangement. It is of course also possible to use any other material weakening as a fracture indication point. How much lower the torsion strength is designed to be in the kerf or other material weakening may vary with the type of vehicle. For example, the momentum from a heavier vehicle creates larger forces on the steering column during a crash. Thus, the torsion strength in the kerf or other material weakening of a heavy vehicle does not need to be lowered as much as in a less heavy vehicle.

Figure 3:
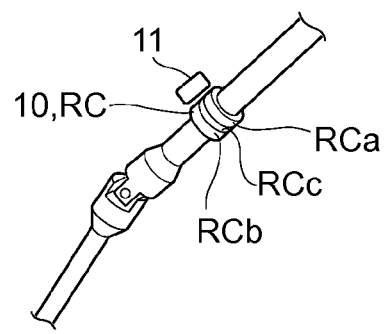
FIG. 3 discloses a second embodiment of a decoupling device.

In FIG. 3, the decoupling device 10 is a rotational coupling RC allowing a rotational movement between the first and second steering column parts 1a, 1b when it is in an unlocked state. The rotational coupling device RC is provided having a construction enabling torque transfer between the steering wheel 2 and the front wheels 3 when it is in a locked state. The device may include a rotor RCa rotatably coupled to one of the first or second steering column part 1a, 1b and an armature RCb coupled to the other one of the second or first steering column part 1a, 1b.

The rotational coupling RC comprises a locking device RCc configured for selective engagement with the rotor RCa. Thus, the locking device RCc is arranged to lock the rotor RCa and the armature RCb of the rotational coupling RC together, which in turn locks the first and the second steering column parts 1a, 1b together, creating the torque transmitting arrangement. The locking device RCc may comprise a mechanical, frictional, hydraulic, magnetic, electromagnetic, electrical or any other type of lock. If a rotational coupling is used as a decoupling device the location point of the decoupling device is preferably in a dry space separated from the environmental moisture and debris, preferably within the vehicle coupe. When an accident is detected, the activation signal triggers an unlocking of the locking device RCc, i.e., disengagement between the rotor RCa and the armature RCb of the rotational coupling RC.

The first and second steering column parts 1a, 1b are then decoupled from each other.

In one embodiment the activation signal activates a force creating device 11, for example a mechanical or pyrotechnical device, connected to the decoupling device 10. The force creating device 11 creates a force or a shock wave having the strength to disengage the locking device RCc or to create a crack in the material of the weakening point MWP which in turn leads to a separation of the first and second steering column parts 1a, 1b.

In exemplary embodiments, the locking device RCc may be a pin, piston or other mechanical connections connecting the rotor RCa and armature RCb of the rotational coupling, where the connection is designed to break at a certain force or is arranged to be moved by a force. Said force may be created by the force creating device 11.

Figure 4:
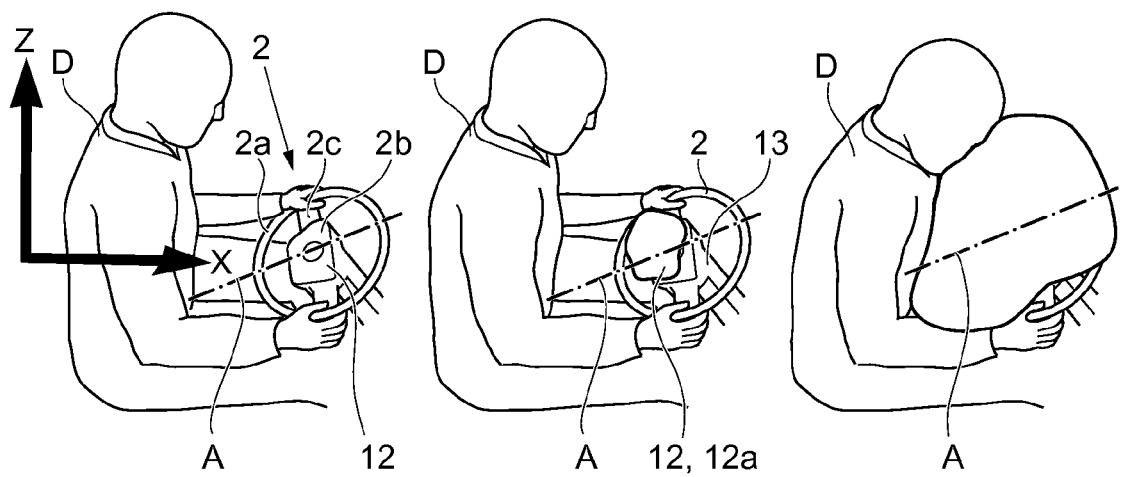
FIG. 4 discloses an embodiment of the steering arrangement comprising an air bag module in a non-activated and activated state.

In FIG. 4, a view of a driver D and a steering wheel 2 according to one embodiment is shown. The steering wheel comprises an outer ring 2a connected to a steering wheel hub 2b via at least one spoke 2c. The steering wheel hub 2b comprises an air bag module 12 arranged to be inflated when an accident situation is detected. The air bag module 12 comprises a symmetrical or asymmetrical air bag cushion 12a. The asymmetrical air bag cushion 12a, is designed to give a better support to the driver D when an accident occurs and the driver is forced towards the front of the car and the steering wheel 2. The asymmetry of the air bag cushion 12a maybe a structure where the inflated cushion is optimized to avoid contact with the chest of a driver D or to reduce pressing contact to minimize force and reduce injury to the chest of a driver D. In order to function properly, the inflated cushion may preferably be arranged essentially parallel to a steering wheel axis A defining a 0 degree turn of the front wheels, thus in a direction which is essentially in line with the spine and upper body of the driver D, i.e., in a direction essentially parallel to the x-z plane of the vehicle in the ENU-coordinate system.

The steering arrangement SA may further comprise a steering wheel lock 13 arranged to prevent the steering wheel 2 from rotating when an accident is detected. If an air bag module 12a with an asymmetrical cushion is located in the steering wheel 2, the steering wheel lock 13 may preferably lock the steering wheel 2 in the asymmetrical air bag optimized position. There the cushion is arranged essentially in line with the steering wheel axis A defining a 0 degree turn of the front wheels.

If an electrical steering system is used to control the rotation of the steering wheel 2, the locking of the steering wheel by the steering wheel lock 13 may be adjusted to occur at one or several specific steering wheel angles, which does not have to be, but may be, in line with the steering wheel axis A. At these steering wheel angles the function of the air bag may be optimized. Thus, when decoupling has occurred it is possible to use the electrical steering system to automatically rotate the steering wheel with respect to the steering column until the steering wheel is oriented in its original zero-position or other positions where the function of the air bag is optimized.

Again, please note that in the detailed description above any embodiment or feature of an embodiment could be combined in any way if such combination is not clearly contradictory.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle steering arrangement comprising:
a steering wheel; and
a torque transmitting steering column arrangement arranged to connect the steering wheel with front wheels of a vehicle, the steering column arrangement comprising at least a first steering column part that is connectable to the steering wheel and a second steering column part that is connectable to the front wheels, wherein the first and second steering column parts are connected to each other by a decoupling device adapted to decouple the first and second steering column parts from each other when an accident is detected so that the second steering column part can rotate in relation to the first steering column part;
wherein the decoupling device is adapted to be activated to decouple the first and second steering column parts when an activation signal is emitted from a sensor that detects when an accident has occurred, and wherein the decoupling device comprises at least one designed material weakening point in the steering column arrangement arranged to separate the steering column arrangement into at least the first and second steering column parts.

2. The steering arrangement according to claim 1 wherein the at least one weakening point has a material weakening with a lower torsion strength than the rest of the steering column arrangement.

3. The steering arrangement according to claim 1 wherein the decoupling device comprises a rotational coupling for allowing a rotational movement between the first and second steering column parts.

4. The steering arrangement according to claim 3 wherein the rotational coupling comprises a locking device arranged to lock the first and the second steering column parts together creating the torque transmitting steering column arrangement.

5. The steering arrangement according to claim 4 wherein the locking device comprises a mechanical, frictional, hydraulic, magnetic, electrical or any other type of lock.

6. The steering arrangement according to claim 1 further comprising a force creating device arranged to activate the decoupling device and to decouple the first and second steering column parts.

7. The steering arrangement according to claim 1 further comprising the sensor for detecting when the accident has occurred.

8. The steering arrangement according to claim 1 wherein the steering wheel comprises a steering wheel hub and a symmetrical or asymmetrical airbag module arranged in the steering wheel hub.

9. The steering arrangement according to claim 1 further comprising a steering wheel lock arranged to prevent the steering wheel from rotating when the first and second steering column parts are coupled together.

10. The steering arrangement according to claim 9 wherein the steering wheel lock is arranged to lock the steering wheel in a position essentially in line with a steering wheel axis defining a 0 degree turn of the front wheels.

11. The steering arrangement according to claim 1 further comprising an electrical steering system adapted to automatically rotate the steering wheel when the first and second steering column parts are coupled together.

12. A vehicle comprising first and second front wheels and a steering arrangement according to claim 1.

13. The vehicle according to claim 12 further comprising an electrical steering system adapted to automatically rotate the steering wheel to assist a driver when the first and second steering column parts are coupled together.

14. A torque transmitting steering column arrangement for use with a vehicle steering wheel, the steering column arrangement comprising:
   a first steering column part that is connectable to the steering wheel; and
   a second steering column part that is connectable to front wheels of a vehicle;
   wherein the first and second steering column parts are connected to each other by a decoupling device adapted to decouple the first and second steering column parts from each other when an accident is detected so that the second steering column part can rotate in relation to the first steering column part, wherein the decoupling device is adapted to be activated to decouple the first and second steering column parts when an activation signal is emitted from a sensor that detects when an accident has occurred, and wherein the decoupling device comprises at least one designed material weakening point arranged to separate the steering column arrangement into the first and second steering column parts.

15. The steering column arrangement according to claim 14 and wherein the at least one weakening point has a lower torsion strength than the rest of the steering column arrangement.

16. The steering column arrangement according to claim 14 wherein the decoupling device comprises a rotational coupling for allowing a rotational movement between the first and second steering column parts.

* * * * *